United States Patent
Horiguchi et al.

(10) Patent No.: US 7,756,390 B2
(45) Date of Patent: Jul. 13, 2010

(54) VIDEO SIGNAL SEPARATION INFORMATION SETTING METHOD AND APPARATUS USING AUDIO MODES

(75) Inventors: Takeo Horiguchi, Yokohama (JP); Yuji Takao, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1092 days.

(21) Appl. No.: 11/434,789

(22) Filed: May 17, 2006

(65) Prior Publication Data

US 2006/0263060 A1    Nov. 23, 2006

(30) Foreign Application Priority Data

May 17, 2005    (JP)    ............................... 2005-144192

(51) Int. Cl.
     *H04N 5/76*    (2006.01)
     *H04N 7/00*    (2006.01)

(52) U.S. Cl. .......................................... 386/46; 386/96

(58) Field of Classification Search .................... 386/1, 386/45–46, 95–96, 111–112, 124–126
See application file for complete search history.

(56) References Cited

U.S. PATENT DOCUMENTS

| | | | |
|---|---|---|---|
| 6,449,021 | B1 | 9/2002 | Ohta et al. |
| 7,269,330 | B1 * | 9/2007 | Iggulden ....................... 386/46 |

| | | | |
|---|---|---|---|
| 2005/0198570 | A1* | 9/2005 | Otsuka et al. ............... 715/515 |

FOREIGN PATENT DOCUMENTS

| | | |
|---|---|---|
| JP | 11-296930 | 10/1999 |
| JP | 2000-115712 | 4/2000 |
| JP | 2000-165796 | 6/2000 |
| JP | 2002-247516 | 8/2002 |
| JP | 2004-088530 | 3/2004 |
| JP | 2004-326926 | 11/2004 |

OTHER PUBLICATIONS

Japanese Office Action dated Jun. 9, 2009 Appln. No. 2005-144192.

\* cited by examiner

*Primary Examiner*—Thai Tran
*Assistant Examiner*—Nigar Chowdhury
(74) *Attorney, Agent, or Firm*—Pillsbury Winthrop Shaw Pittman, LLP

(57) ABSTRACT

It is determined whether or not the total length or ratio of periods in which an audio signal is set in a first mode with respect to the preset length of recorded program video signals is not larger than the preset length or ratio. When the total length or ratio is not larger than the preset length or ratio, the audio mode of the main body portion of the recorded video signal is determined to be the second mode. When it is determined that the audio mode is not the second mode, the audio mode of the main body portion is determined to be the first mode. Then, an adaptive processing section (algorithm) which forms separation information in a desired period of the video signal is set according to the above determination result and the thus formed separation information is stored.

11 Claims, 15 Drawing Sheets

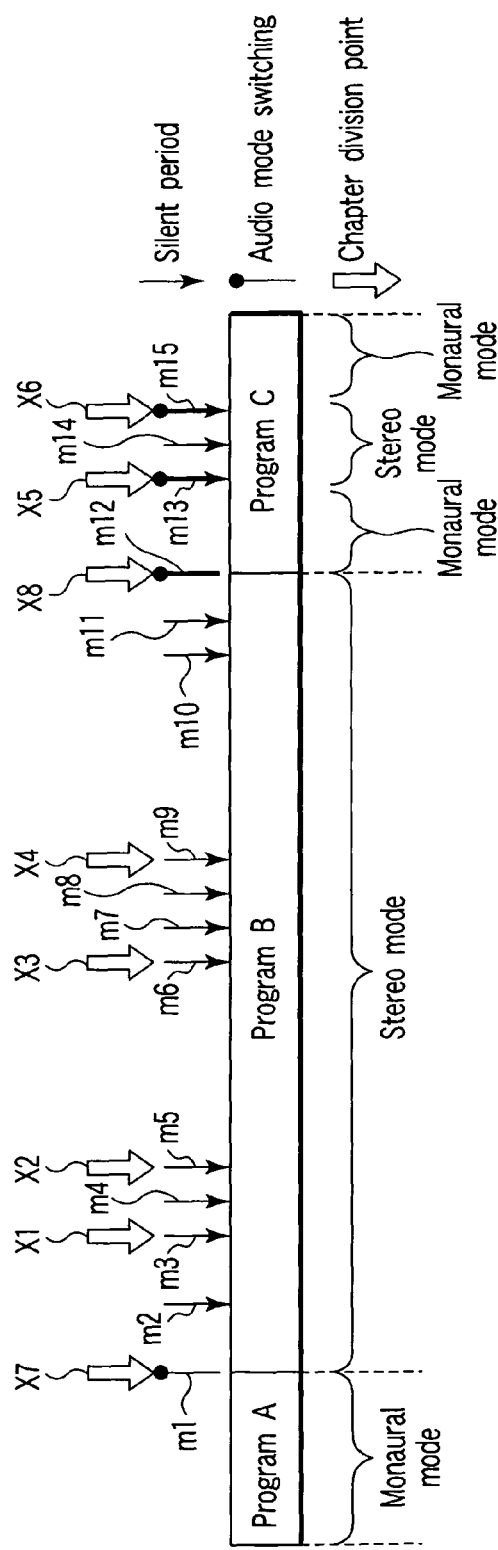
F I G. 4
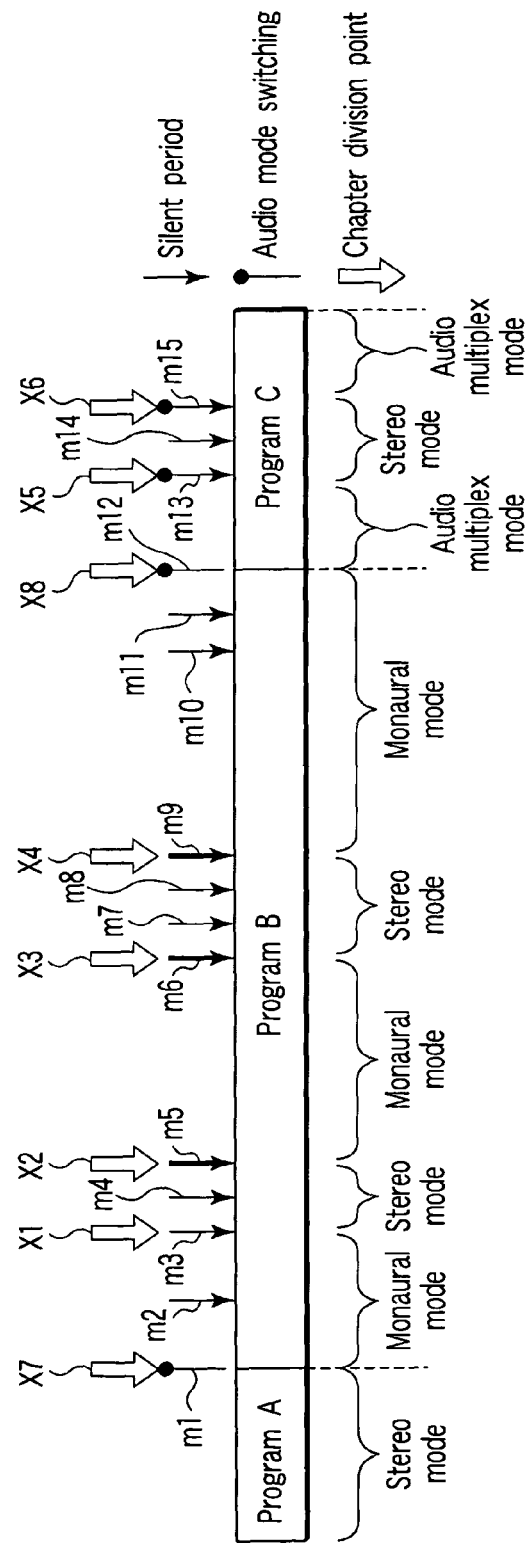
F I G. 5

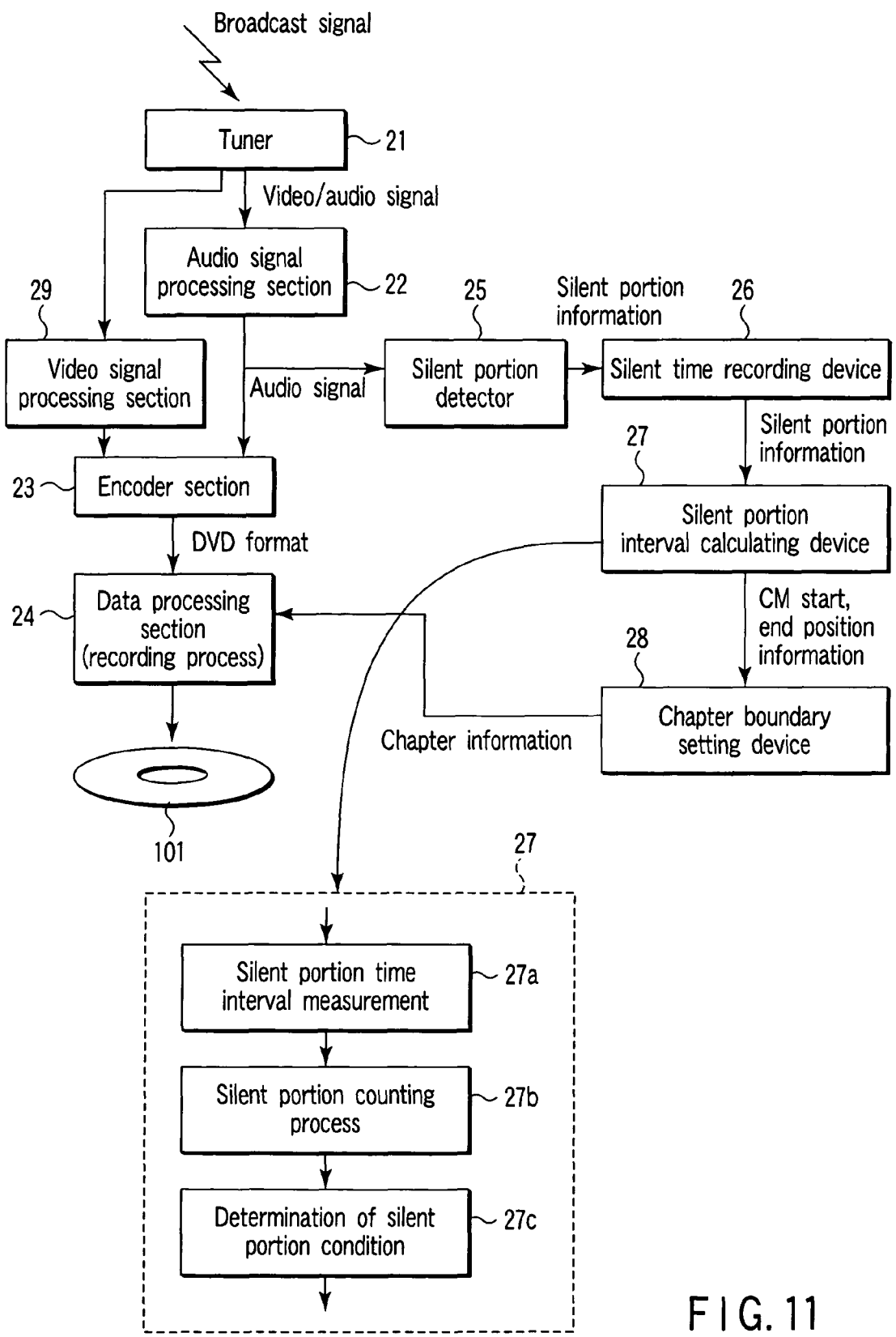
F I G. 11

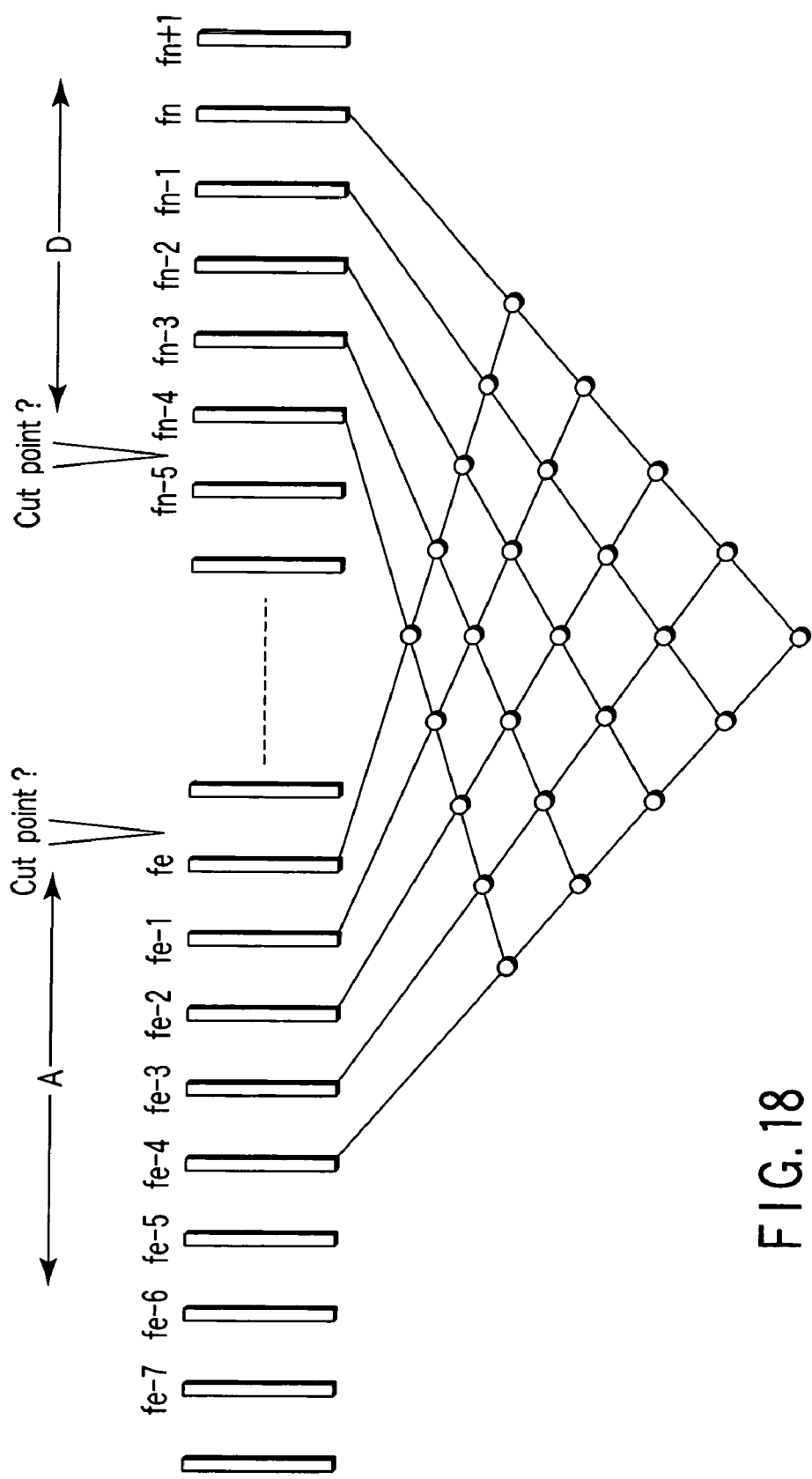
F I G. 18

VIDEO SIGNAL SEPARATION INFORMATION SETTING METHOD AND APPARATUS USING AUDIO MODES

CROSS-REFERENCE TO RELATED APPLICATIONS

This application is based upon and claims the benefit of priority from Japanese Patent Application No. 2005-144192, filed May 17, 2005, the entire contents of which are incorporated herein by reference.

BACKGROUND

1. Field

One embodiment of the present invention relate to a method and apparatus for setting video signal separation information by use of an audio mode in order to structurize video information. That is, the embodiments relate to a method and apparatus used when the features of at least one of video data and audio signals are acquired to separate the video information for each chapter and structurize the video information.

2. Description of the Related Art

In television broadcast signals, generally, commercial (CM) time is provided in a boundary between programs or in the course of programming. There is provided a piece of equipment which detects a candidate interval of the CM portion based on an audio mode (for example, refer to Jpn. Pat. Appln. KOKAI Publication No. 2000-165796 (corresponding to U.S. Pat. No. 6,449,021B1)). Further, there is provided a piece of equipment which detects a silent period irrespective of the audio mode and sets separation information in a preset position of the silent period (for example, refer to Jpn. Pat. Appln. KOKAI Publication No. 2004-326926). If the silent period is an integral multiple of 15 seconds, it is determined that the detected period is a CM period.

In the above conventional technique, when it is determined that the period of the audio mode (stereo mode) is the CM period, when voice of the stereo mode is also present in the main body portion in a period other than the CM period or when the stereo and monaural modes exist together, it becomes impossible to precisely identify only the CM period. Further, in the equipment which detects the silent period and forms separation information, the operation thereof depends on the precision of detection of the silent state.

BRIEF SUMMARY OF THE INVENTION

An object of the embodiments is to provide a video signal separation information setting method and apparatus using an audio mode in which adequate separation information for the main body portion can be attained even if a plurality of audio modes are provided together in a program.

In order to achieve the above object, a video signal separation information setting method according to one aspect of the present invention comprises determining whether one of the total length and ratio of periods in which an audio signal is set in a first mode with respect to a set length of a recorded video signal is not larger than a corresponding one of preset length and ratio, determining that the audio mode of the main body portion of the recorded video signal is a second mode when one of the total length and ratio is not larger than the corresponding one of the preset length and ratio, determining that the audio mode of the main body portion is the first mode when the audio mode of the main body portion is not the second mode, setting an adaptive processing section (algorithm) which forms separation information of a desired period of the video signal according to the determination result, and storing the thus formed separation information.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an explanatory diagram showing an example in which marks are attached to switching points of audio modes of an audio signal contained in a composite signal, for illustrating another example of the operation of the apparatus of the invention;

FIG. 5 is an explanatory diagram showing an example in which marks are attached to switching points of audio modes of an audio signal contained in a composite signal, for illustrating still another example of the operation of the apparatus of the invention;

FIG. 11 is an exemplary diagram showing the basic configuration of a piece of equipment which detects a silent portion in an embodiment of the invention;

FIG. 18 is a diagram showing another example of the chapter dividing process similar to the automatic chapter dividing operation of a main body portion in the invention;

DETAILED DESCRIPTION

Various embodiments according to the invention will be described hereinafter with reference to the accompanying drawings.

Figure 1:
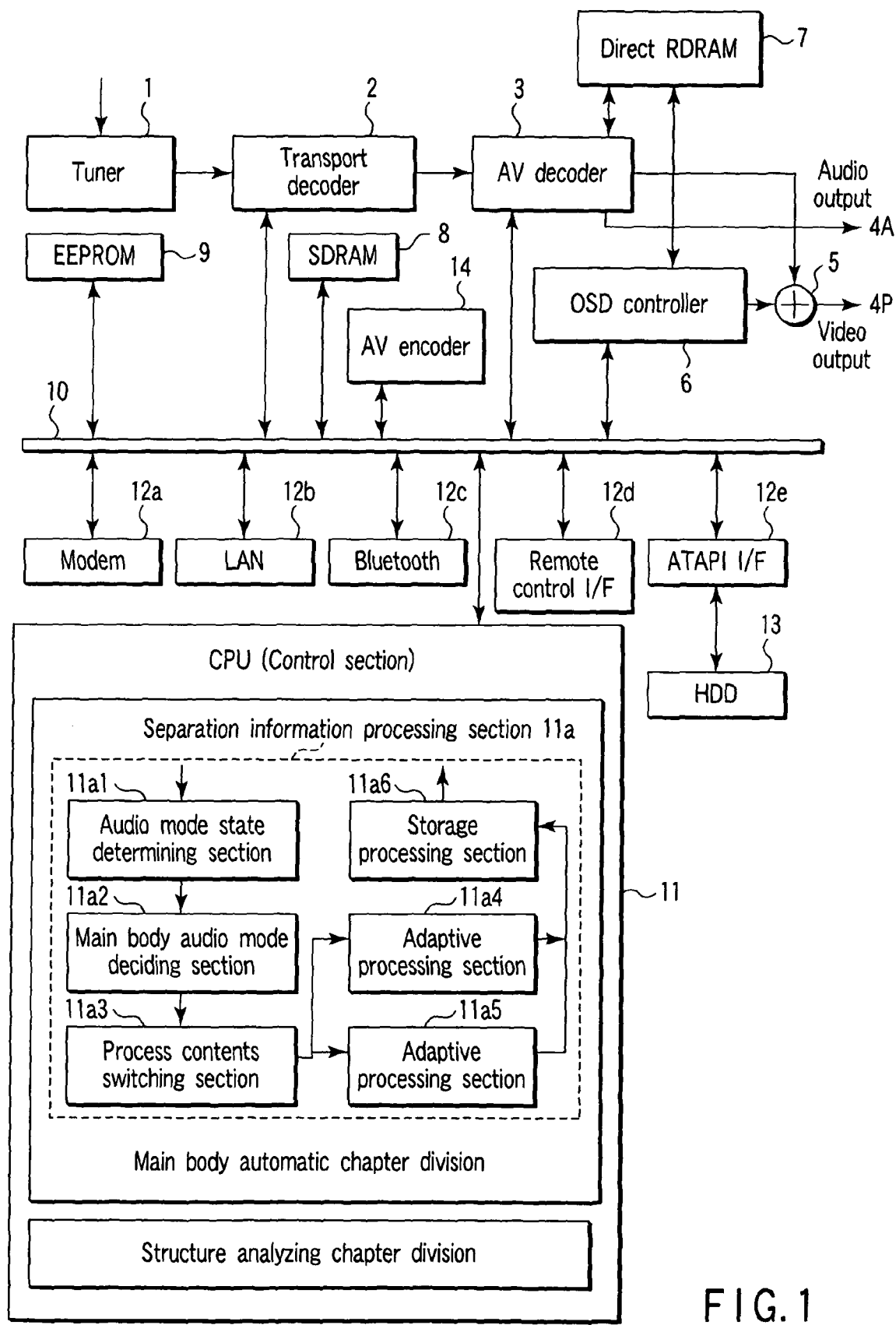
FIG. 1 is an exemplary diagram showing the basic configuration of a signal processing apparatus, for illustrating one embodiment of the invention.

FIG. 1 is an example of the configuration of a signal processing apparatus to which this invention is applied. The signal processing apparatus can be applied to a digital television receiver or information recording and reproducing apparatus, for example.

A tuner 1 receives a digital broadcast signal, demodulates the received signal and supplies the demodulated output to a transport decoder 2, for example. A video signal/audio signal of a program selected by the transporter decoder 2 is input to an audio-video (AV) decoder 3 for each packet and demodulated. An audio output demodulated by the AV decoder 3 is output to an output terminal 4A and a video output is output to an output terminal 4P. A video signal of the output terminal 4P may be synthesized with a video signal from an ON-screen display (OSD) controller 6 in a synthesizing circuit 5 in some cases.

A direct RDRAM 7 is used to temporarily store data from the AV decoder 3 or OSD controller 6. For example, an SDRAM 8 is used to temporarily store data when the received signal is subjected to an error correction process. An EEPROM 9 is used to hold parameters or programs which are used to execute the function of the apparatus, for example.

A main bus 10 is connected to the transport decoder 2, AV decoder 3, OSD controller 6, SDRAM 8, EEPROM 9 and the like. Further, a CPU 11 which is a control section used to control the apparatus is connected to the main bus 10. Further, the apparatus can be connected to external equipment via the bus 10. For this purpose, the main bus 10 is connected to a modem interface 12a, LAN terminal 12b, Bluetooth interface 12c, remote control interface 12d and ATAPI interface 12e. A hard disk drive 13 can be connected thereto via the interface 12e. Further, an AV encoder 14 is connected to the main bus 10 and a video signal can be converted into a preset format (for example, based on the DVD standard) with which it is recorded on a recording medium.

In the CPU 11, roughly speaking, two functions, such as an automatic chapter division function of a main body portion and a structure analyzing chapter division function (which can be referred to as a magic chapter division function) are provided.

In order to execute the automatic chapter division function of a main body portion, a separation information processing section 11a which forms separation information used to set a desired interval of a video signal by using an audio mode is provided.

The separation information processing section 11a includes an audio mode state determining section 11a1 which determines whether or not the total length or ratio of periods in which an audio signal is set in a first mode (monaural mode or audio multiplex mode) with respect to the total length of the video signal of a recorded program is not larger than a preset length or preset ratio. Further, it includes a main body audio mode deciding section 11a2 which receives the determination result in the audio mode state determining section 11a1 to determine that the audio mode of the main body portion of the recorded video signal is a second mode (stereo mode) when the total length or ratio of the monaural mode is equal to or smaller than the preset length or ratio and determines that the audio mode of the main body portion is the first mode (monaural mode or audio multiplex mode) when it is not set in the second mode (stereo mode).

Then, a process contents switching section 11a3 selectively switches adaptive processing sections 11a4, 11a5 used to form separation information in the desired interval of the video signal according to the determination result of the main body audio mode deciding section 11a2. Further, it includes a storage processing section 11a6 which stores the separation information formed by the selected adaptive processing section. For example, the adaptive processing section 11a4 generates separation information when the audio mode is switched. The adaptive processing section 11a5 generates separation information in the silent portion of the audio signal. Both or one of the above two separation information items is used and selected according to control information from the process contents switching section 11a3.

Figure 2:
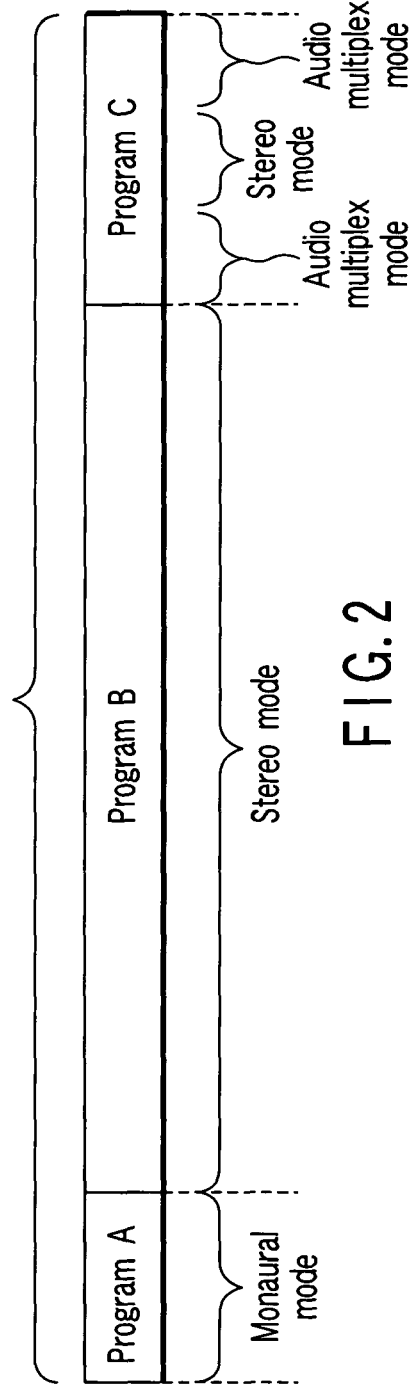
FIG. 2 is an explanatory diagram showing an example of an audio mode of an audio signal contained in a composite signal, for illustrating the operation of the apparatus of the invention.

FIG. 2 shows an example in which various audio modes such as a monaural mode, stereo mode and audio multiplex mode are provided together in an audio signal contained in a composite signal broadcasted. In this example, the composite signal is a signal which contains both of the video signal and audio signal. In FIG. 2, a case wherein a program A (monaural audio mode), program B (stereo audio mode) and program C (audio multiplex mode and stereo mode are provided together) are sequentially recorded and processed is shown.

Figure 3:
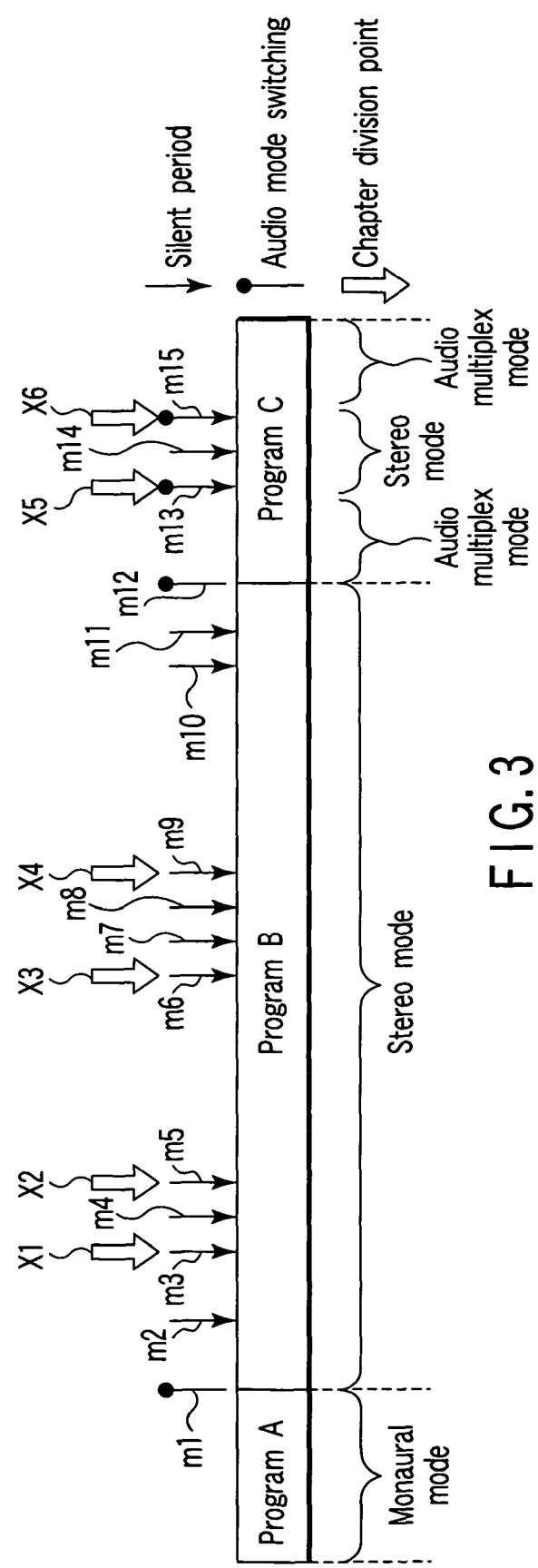
FIG. 3 is an explanatory diagram showing an example in which marks are attached to switching points of audio modes of an audio signal contained in a composite signal, for illustrating an example of the operation of the apparatus of the invention.

FIG. 3 shows an example in which separation information is formed by analyzing the audio signal according to one embodiment of this invention. In FIG. 3, a case wherein the programs A, B and C are sequentially recorded and processed is shown.

In this case, positions to which marks m1, m12, m13, m15 are attached are positions in which the audio modes are switched. Positions to which marks m2 to m11, m13, m14, m15 are attached are positions in which the silent portion is detected. In the apparatus of this invention, a function of detecting a silent portion is contained in the stereo mode. The function enables chapter dividing points in the first and last silent portions of the successive silent portions to be set when, for example, a condition that all of the intervals between adjacent ones of the three or more successive silent portions are integral multiples of a preset time period (for example, 15 seconds) is satisfied. The concrete configuration and process of the above function are explained in detail later.

In FIG. 3, since the successive marks m3, m4, m5 satisfy the above condition, chapter dividing points (separation information items) x1, x2 are set. Further, since the successive marks m6 to m9 satisfy the above condition, chapter dividing points (separation information items) x3, x4 are set.

Also, since the successive marks m13, m14, m15 satisfy the above condition, chapter dividing points (separation information items) x5, x6 are set.

In this example, the portion of the audio signal whose audio level is lower than the threshold level for a preset period of time is determined as a silent portion when the main body portion is set in the stereo mode. Further, it is determined whether the time interval between a silent portion and a next silent portion is an integral multiple of the preset time period (A). If the time interval is an integral multiple of the preset time period (A), the number of detected silent portions is counted and if the counted number is not smaller than a threshold value (B), separation information is set in each of first and last silent portions.

FIG. 4 illustrates another embodiment of this invention. The same portions as those of FIG. 3 are denoted by the same reference symbols used in FIG. 3. In this example, chapter dividing points (separation information items) x7, x8 are attached to portions at which the audio mode is switched in addition to the example of FIG. 3. In this embodiment, separation information can be attached to a boundary of the program.

FIG. 5 shows an example in which separation information is attached each time the audio mode is switched when the main body portion is not set in the stereo mode. Of course, the determination method used when it is set in the stereo mode as shown in FIG. 4 is also used. That is, even if the main body portion is not set in the stereo mode, the commercial portion is set in the stereo mode and a plurality of commercials are broadcasted with a silent portion set therebetween in some cases. In such a case, marks are set to all of the silent portions, but separation information items are set to the head and end of the commercial portion. In the case of this example, separation information is set only in a portion in which the audio mode is switched.

Figure 6:
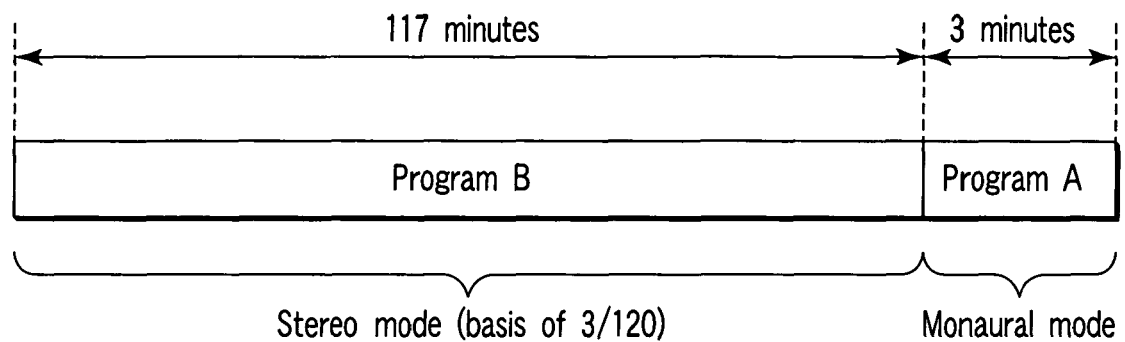
FIG. 6 is an explanatory diagram for illustrating an example of calculation for a preset ratio of a specified audio mode to a plurality of audio modes of the audio signal contained in the composite signal.

FIG. 6 shows an example in which the rate of the stereo mode and monaural mode of the audio signal is measured. In this invention, it is determined whether or not the total length or ratio of periods in which the audio signal is set in the monaural mode (first mode), for example, is not larger than the preset length or preset ratio. The preset ratio is set between 3/120 and 1/2. If the period of the monaural mode is not shorter than three minutes and not longer than one hour in the case of a two-hour (120-minute) program, it is determined that the main body portion is set in the stereo mode. The monaural program of three minutes may include a short program such as a news program, for example. Further, if the ratio of the period in which the audio signal is not set in the stereo mode becomes equal to or larger than 1/2, an inconsistency will occur in the determination result.

Figure 7:
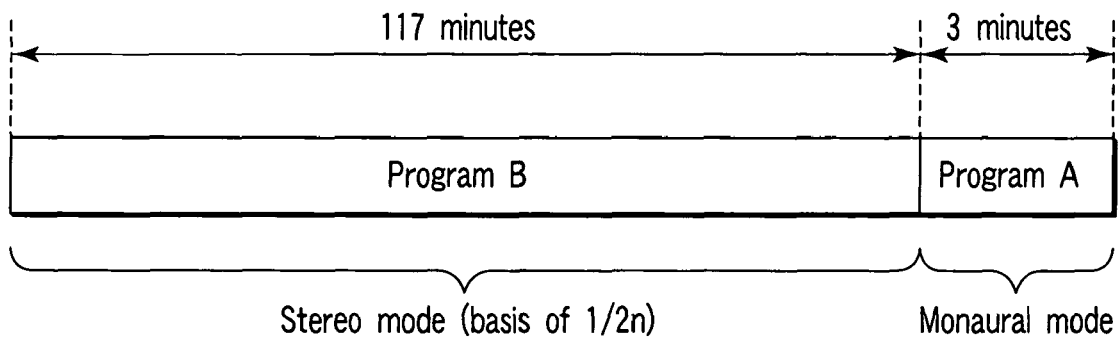
FIG. 7 is an explanatory diagram for illustrating another example of calculation for a preset ratio of a specified audio mode to a plurality of audio modes of the audio signal contained in the composite signal.

FIG. 7 is an explanatory diagram for illustrating a method of simplifying the calculation when the ratio of the length (for example, three minutes) of the period in which the audio signal is set in the monaural mode with respect to the two-hour program (the total length of the video signal) is calculated. For calculation, 120 minutes×$1/2^n$ is calculated and compared with three minutes. It is easy to calculate $1/2^n$ by use of a computing machine. In order to calculate $120×1/2^n$, 120 may be expressed by use of a binary number and then shifted by n bits.

Figure 8:
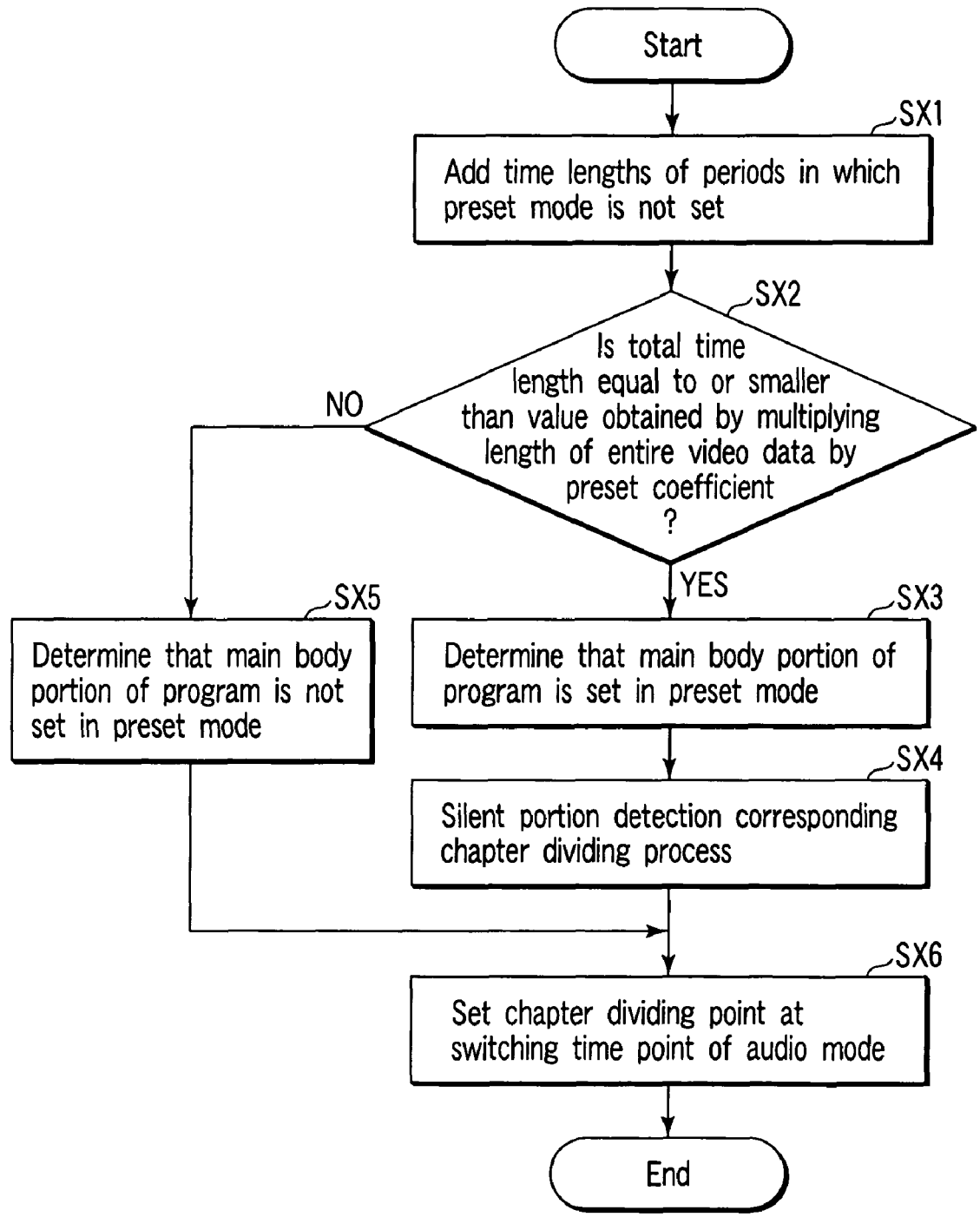
FIG. 8 is an exemplary flowchart for illustrating the representative operation of the apparatus according to the invention.

FIG. 8 is a flowchart for illustrating the representative operation of the above embodiment. The time lengths of periods in which the program is not set in the preset mode (stereo mode) are added up (step SX1). Then, it is determined whether or not the totalized time length is not larger than a value obtained by multiplying the total length of the recorded video image by a preset coefficient (step SX2). If the totalized time length is not larger than the result of multiplication of the preset coefficient, it is determined that the main body portion of the program is set in the preset mode (stereo mode) (step SX3). Next, a process of setting a chapter dividing point is performed according to the condition for determination as explained with reference to FIGS. 3 and 4 by the silent portion detecting operation (step SX4).

However, if it is determined in the step SX2 that the totalized time length is larger than the value obtained by multiplication of the preset coefficient, it is determined that the main body portion of the program is set in the monaural mode or audio multiplex mode which is not the preset mode (stereo mode) (step SX5).

After the step SX4 or SX5, a chapter dividing point (separation information) is also set in a switching point of the audio mode in the step SX6.

After this, information (separation information) of the chapter dividing point is recorded as part of management information on a recording medium, for example. The information is described as an entry point in the management information, for example.

In the above embodiment, for example, the audio mode of the main body portion is first specified as a monaural or stereo mode and then an adaptive process (algorithm) which forms separation information between desired periods of the video signal is set according to the specified audio mode. Thus, adequate information can be attained as separation information between desired periods of the main body portion.

Attribute information may be attached to the entry point (separation information). As explained in FIGS. 3 and 4, the attribute information is used to separate the separation information items x1, x2, x3, x4, x5, x6 set by detecting the silent portion and the separation information items x7, x8 set with reference to the audio mode.

Figure 9:
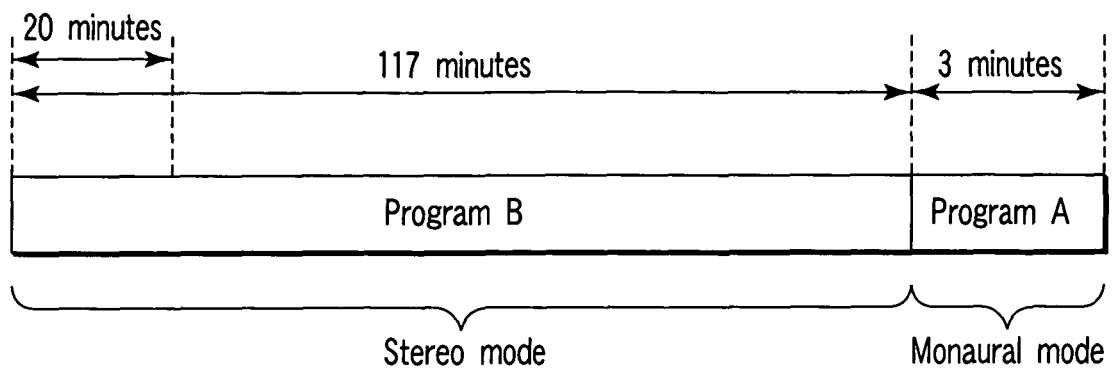
FIG. 9 is an explanatory diagram showing an idea for illustrating another embodiment of the invention.

FIG. 9 shows an example in which the audio mode of the whole portion of the recorded program is not checked but the audio signal of a composite signal in part of a period (for example, 20 minutes after starting) of the program is checked, for example. Whether the main body portion is a stereo mode or not is determined according to the ratio of the period in which the preset audio mode is not set to the period of 20 minutes.

Figure 10:
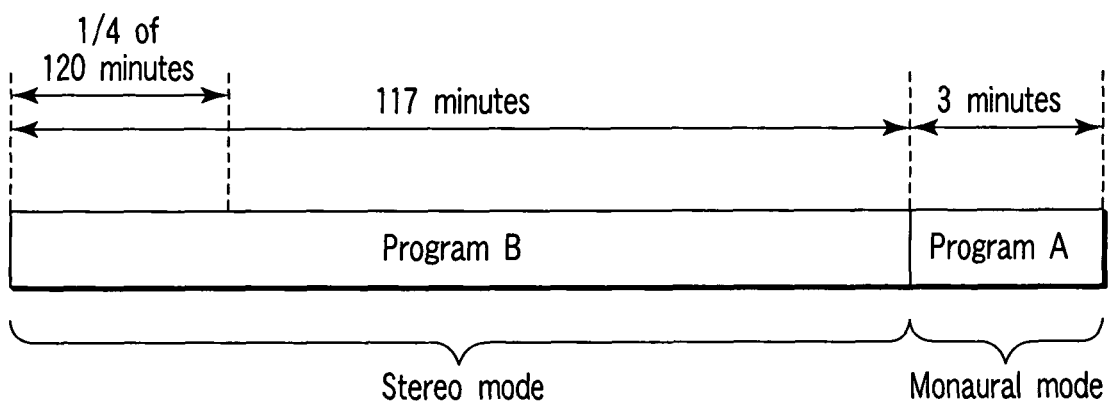
FIG. 10 is an explanatory diagram showing an idea for illustrating a further embodiment of the invention.

An example of FIG. 10 is a modification of the example of FIG. 9. In the example of FIG. 9, the period of the preset length from the start of the program is checked. However, in the example of FIG. 10, a period of a preset rate from the start of the program is checked. For example, when the whole length of the recorded program is 120 minutes, the period which is 1/4 of the above whole length is checked. Whether the main body portion is set in the stereo mode or not is determined according to the rate of a period in which the preset audio mode is not set in the above period.

Next, a method of setting separation information items in the start and end positions of the CM period is explained more in detail. In this method, a silent portion is detected in the audio signal of the stereo mode and if the interval of the silent portion is an integral multiple of a preset time period (15 seconds), a period in which a plurality of silent portions successively appear is determined as a CM period. Then, information items are set in the silent portions which are present in the start and end positions of the CM period.

FIG. 11 shows an example of the basic configuration of a piece of equipment which utilizes the silent portions. The configuration corresponds to the adaptive processing section 11*a*5 shown in FIG. 1. In FIG. 11, a broadcast signal is received by a tuner 21. A video and audio signal of a program of a selected channel is output from the tuner 21. The audio signal is subjected to the demodulation/decoding process in an audio signal processing section 22. An output of the audio signal processing section 22 is supplied to an encoder section 23 and silent portion detector 25 which will be described later.

The encoder section 23 encodes video and audio signals into a preset format based on the DVD standard and supplies an output thereof to a data processing section 24. The data processing section 24 can modulate and record information on a hard disk, DVD-R, DVD-RW or DVD-RAM. Further, it can subject information read out from the above disk to a demodulation process. It also has a processing function associated with an error correction code (ECC).

An output of the audio signal processing section 22 is also supplied to the silent portion detector 25. The silent portion detector 25 detects a portion in which the audio level is lower than a threshold level for a preset time period as a silent portion. At this time, the silent portion detector 25 outputs and supplies silent information to a silent time recorder 26. That is, the silent time recorder 26 accumulates silent portion information (information of time at which the silent portion is determined) in the program.

The silent time information recorded on the silent time recorder 26 is used in a silent portion interval calculator 27. In the calculator, it is determined whether the time interval between a silent portion and a next silent portion is an integral multiple of preset time (A). If the above time interval is an integral multiple of the preset time (A), the number of silent portions is counted and if the count number of silent portions becomes equal to or larger than a threshold value (B), the first silent portion and last silent portion are supplied respectively as CM start information and CM end information to a chapter boundary setting device 28 in order to set chapter separation information items in the first and last silent portions.

As a result, the chapter boundary setting device 28 forms chapter information and supplies the same to the data processing section 24. The data processing section 24 converts the chapter information into an entry point in management information of the DVD standard and manages the information.

Video information is processed by a video signal processing section 29, input to the encoder 23 and then converted into data with a preset DVD standard. Then, an output of the encoder 23 is supplied to and recorded on the optical disk 101 via the data processing section 24.

In this case, the silent portion interval calculator 27 includes a silent portion time interval measuring section 27a which determines whether or not the time interval between a silent portion and a next silent portion is an integral multiple of preset time (A) when it is further divided into a block form. Further, it includes a count-of-silent-portion processing section 27b which counts the number of detection times of silent portions when the time interval is an integral multiple of the preset time (A), and a silent portion condition determining section 27c which sets separation information items in the first and last silent portions if the count number of silent portions becomes equal to or larger than the threshold value (B).

Figure 12:
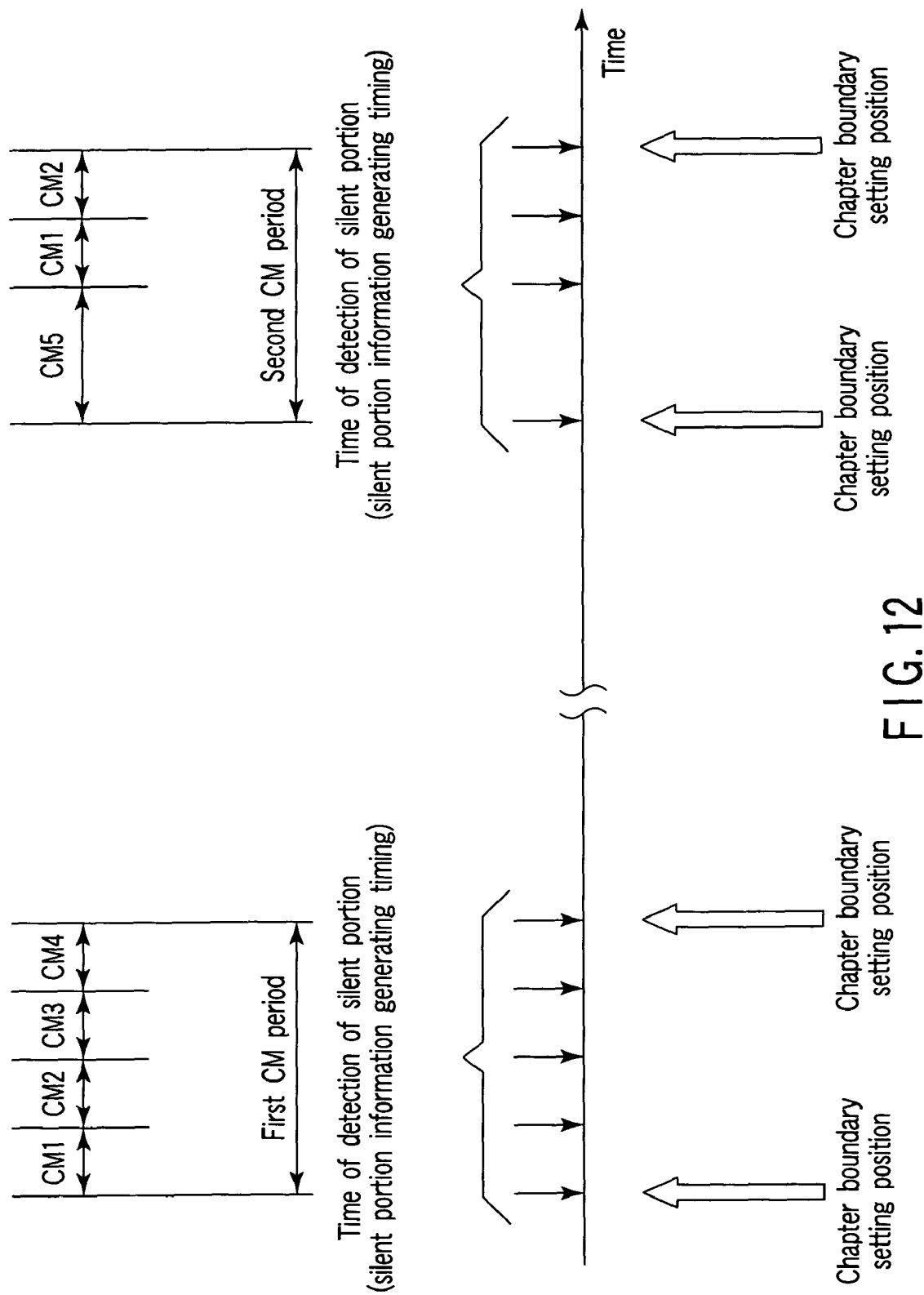
FIG. 12 is an explanatory diagram for illustrating the division principle for automatic chapter division of a main body portion in the invention.

FIG. 12 shows time at which a silent portion is detected by use of the silent portion detector 25, silent time recorder 26, silent portion interval calculator 27 and chapter boundary setting device 28 and time at which chapter information is acquired for chapter boundary setting on the time base. For easy understanding, the explanation is simplified. FIG. 12 shows an example in which two commercial periods are present in one program (for example, a program set for recording), for example.

An example in which four commercials CM1, CM2, CM3, CM4 are broadcasted in the first commercial period and three commercials CM5, CM1, CM2 are broadcasted in the second commercial period is shown.

For example, in the first commercial period, since a silent period exists in the separating portion of each commercial, a silent portion detection flag is acquired. However, since a portion after CM4 does not satisfy the condition which will be described later, the end of CM4 is determined as a chapter boundary position. Further, the position of a silent portion detection flag immediately before start of the first CM1 is set as a chapter boundary. That is, flags indicating the chapter boundaries are set before and after the commercial period. Likewise, in the second commercial period, chapter boundaries are not set in all of the silent portions, but a plurality of CMs which satisfy a preset condition (successively broadcasted) are grouped and a chapter boundary is set with each group used as one unit.

Figure 13:
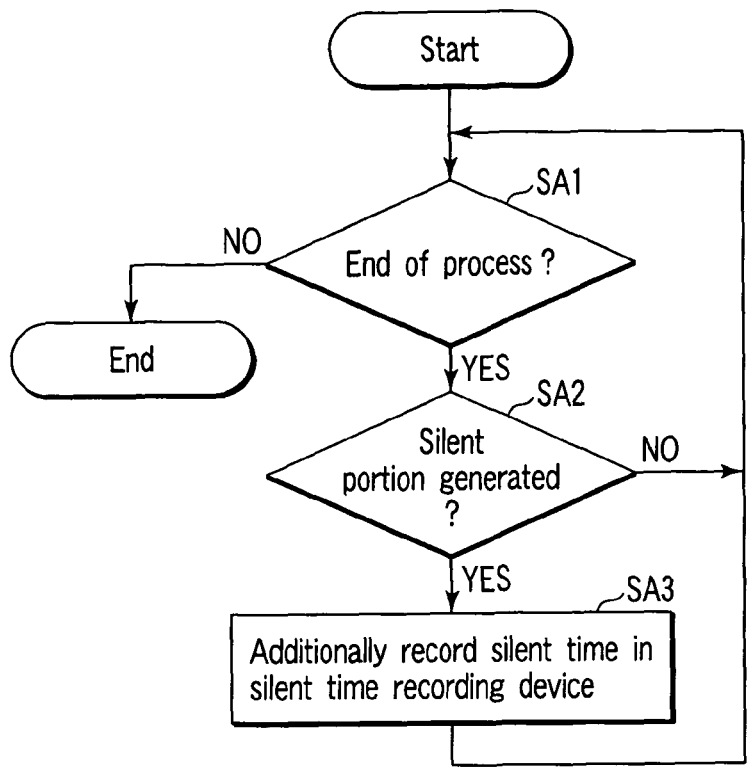
FIG. 13 is an exemplary flowchart for illustrating a silent portion detecting block used for the automatic chapter division of a main body portion in the invention.

In FIG. 13, the step of performing the above process is expressed by a large block. Whether the chapter setting process for one program is terminated or not is determined (step SA1), and if the above process is not terminated, the silent portion detecting process is performed to detect a silent portion (step SA2). If a silent portion is detected, the time at which the silent portion is detected is stored, as explained before (step SA3). When management information is processed at the end of the program, the chapter boundary is set as an entry point in the management information, as explained in FIG. 2.

Figure 14:
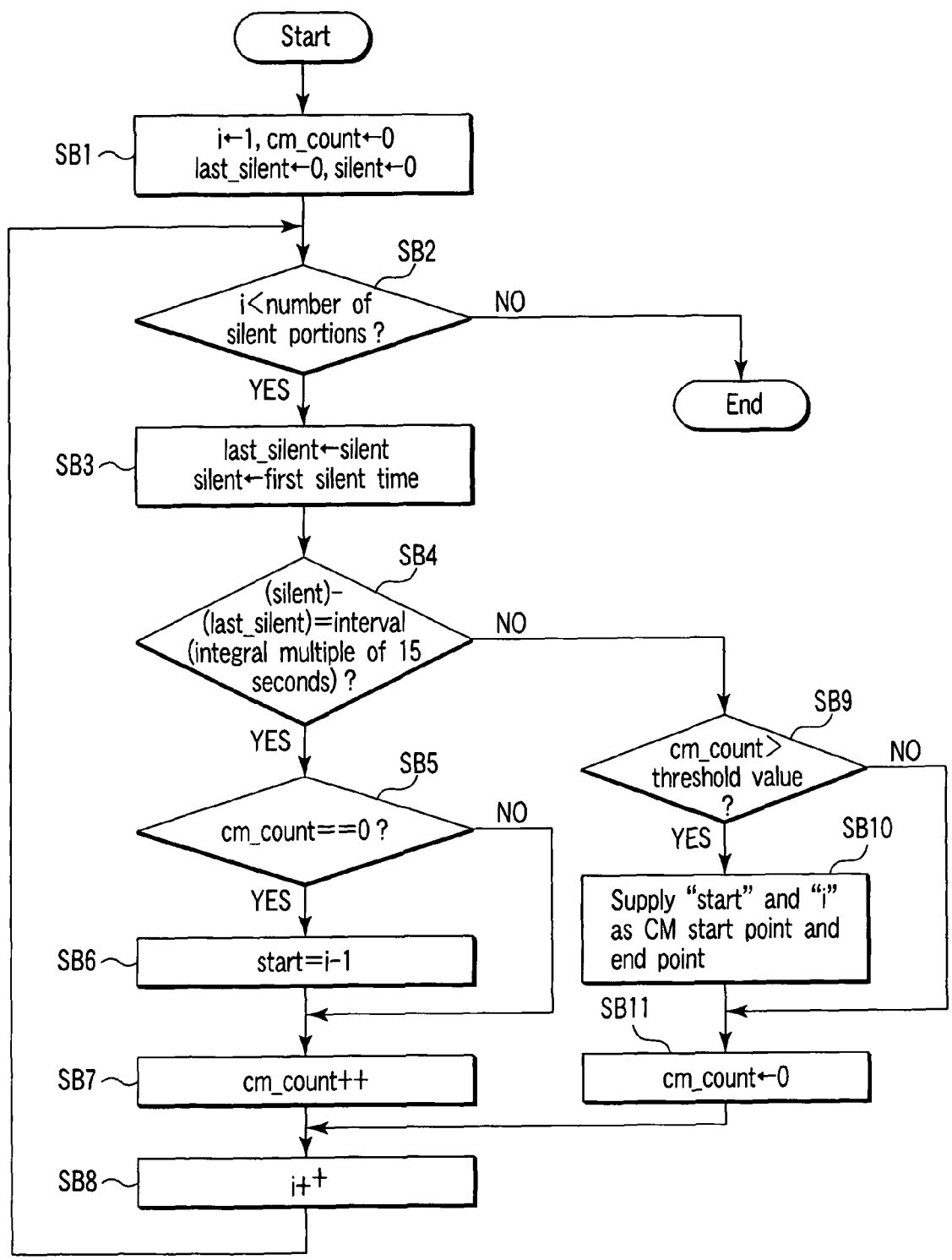
FIG. 14 is an exemplary flowchart for illustrating a process of the CM detecting operation used for the automatic chapter division of a main body portion in the invention.

FIG. 14 is a flowchart for illustrating a process when the chapter boundaries at the CM start and end times are determined when silent portions are sequentially detected in the commercial period. When the process is started, first, i is used as information which indicates the order of a silent portion when the silent portion is detected. When the first silent potion is detected, "1" is set as i, "0" is set as cm_count of the CM count value (cm_count), "0" is set as last_silent of time (last_silent) of the last silent portion, and "0" is set as silent of time (silent) of a next detected silent portion (step SB1).

If the number of detected silent portions is smaller than i when a silent portion is detected, the time (silent) set in the preceding cycle is set as last_silent and the present cycle time (silent) is set as the time of an i-th silent portion (steps SB2, SB3). Then, "(silent)-(last_silent)" is calculated and whether the result of calculation is an integral multiple of 15 seconds or not is determined. This is because a commercial is broadcasted in the unit of 15 seconds or in the unit of the integral multiple thereof in many cases.

If the result of calculation is 15 seconds (value A) or the integral multiple thereof, whether cm_count="0" or not is determined (step SB5). In the case of "0", it indicates the time immediately after the commercial counting operation is started. Since (i−1) corresponds to the commercial start time, (i−1) is set to (start) in the step SB6.

If it is determined in the step SB5 that cm_count is not equal to 0, it indicates that the commercial period is already started and the process proceeds to the step SB7 to increment (cm_count) by +1. After the step SB7, the process of (i+1) is performed (step SB8) and the process returns to the step SB2.

In the previous step SB4, if the result of calculation of "(silent)-(last_silent)" is not the integral multiple of 15 seconds (value A), the above period is determined not to be a commercial period. At this time, the process proceeds to the step SB9 and whether cm_count accumulated so far satisfies the relation of cm_count>threshold value (B) or not is determined. If the relation is satisfied, it is determined that a plurality of commercial groups are broadcasted. Then, the start time at this time and time at which the present i accumulatively added is attained are respectively set as CM start time and CM end time and supplied to the chapter boundary setting device (step SB10). After this, the relation of cm_count=0 and i=0 is set.

The preset time (value A) can be made variable. In order to make the value A variable, a special setting user guidance menu is prepared to make the value variable. Further, the threshold value (B) may be set to have a preset margin.

Figure 15:
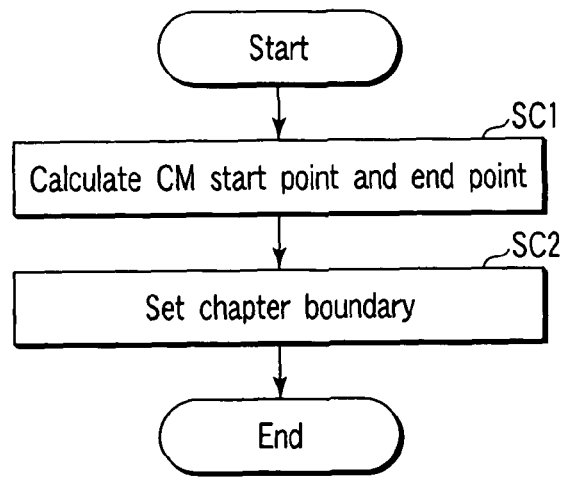
FIG. 15 is an exemplary flowchart for illustrating a large block for the diving operation for the automatic chapter division of a main body portion in the invention.

FIG. 15 is a flowchart for illustrating the operation of the chapter boundary setting device 28. The procedure of acquiring information items of CM start time and end time (step SC1) and setting a chapter boundary (step SC2) is shown.

As described above, according to the method and apparatus of this invention, silent portions are detected in the commercial broadcasting period, all of the silent portions are not set as chapter boundaries, and the start and end positions of a plurality of successive commercials (successive commercial group) are detected.

The user can ON-OFF control the operation of the above function by selecting a button. In this case, the user selects a detail setting button on a screen used for program setting and can set the operation ON or OFF while watching the detail setting screen.

Figure 16:
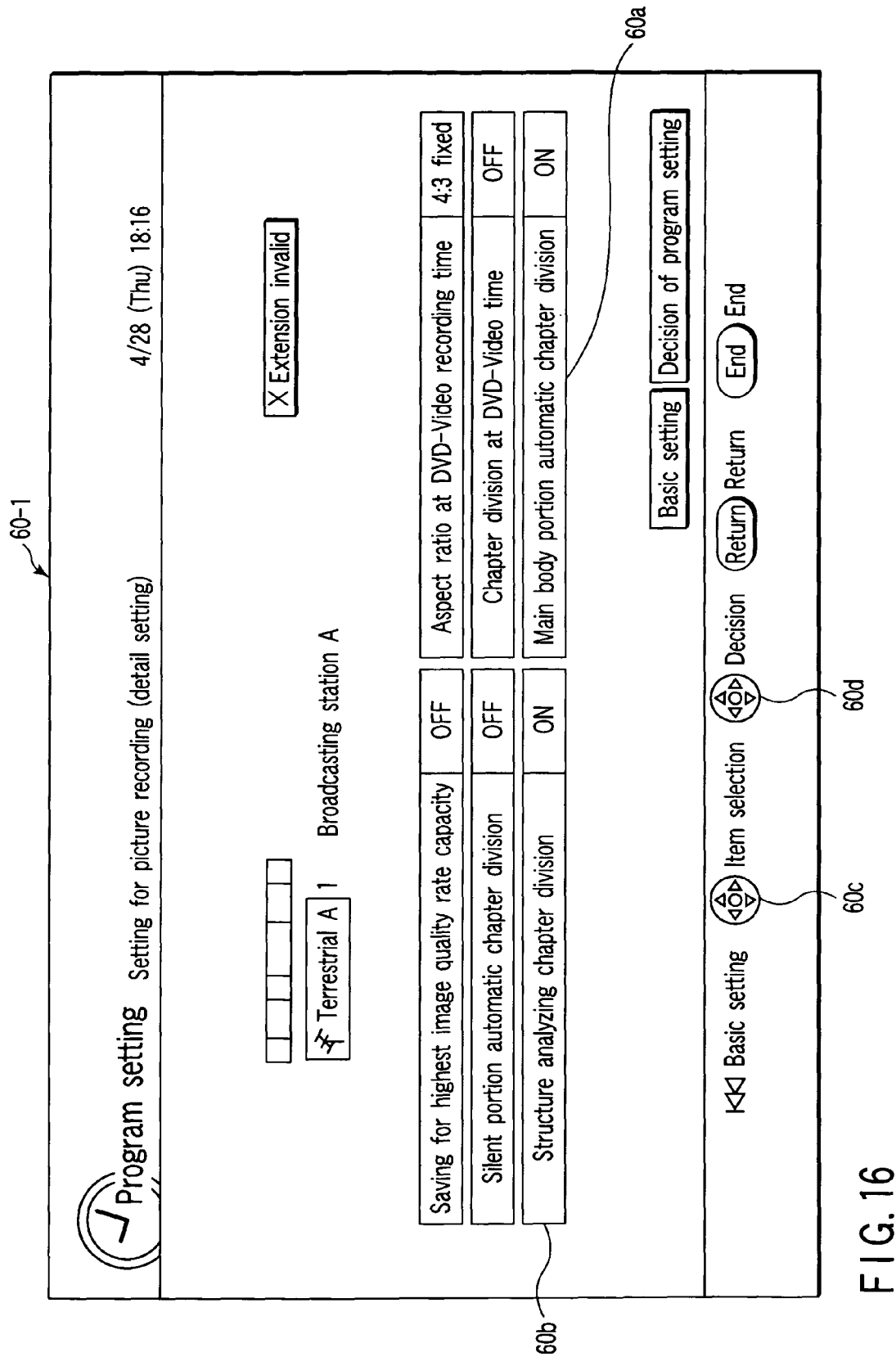
FIG. 16 is an exemplary diagram showing a screen used to set the automatic chapter dividing operation of a main body portion in the invention.

FIG. 16 shows an example of a detail setting screen 60 appearing when a program is set for program-recording and a "detail setting" button on the program setting screen is selected and clicked. As shown in FIG. 16, an item 60a of "automatic chapter division of main body" is set in the ON state. In this state, it indicates that the chapter dividing operation explained before can be performed. The "ON" and "OFF" states can be cyclically switched by depressing a decision key while a cursor is set on the item 60a by the remote control operation.

Further, on the screen 60, an item 60b of "structure analyzing chapter division" is provided. The function of the "structure analyzing chapter division" and the function (detection of the CM period is precise) of the "automatic chapter division of main body" are different from each other in the chapter dividing operation.

Figure 17:
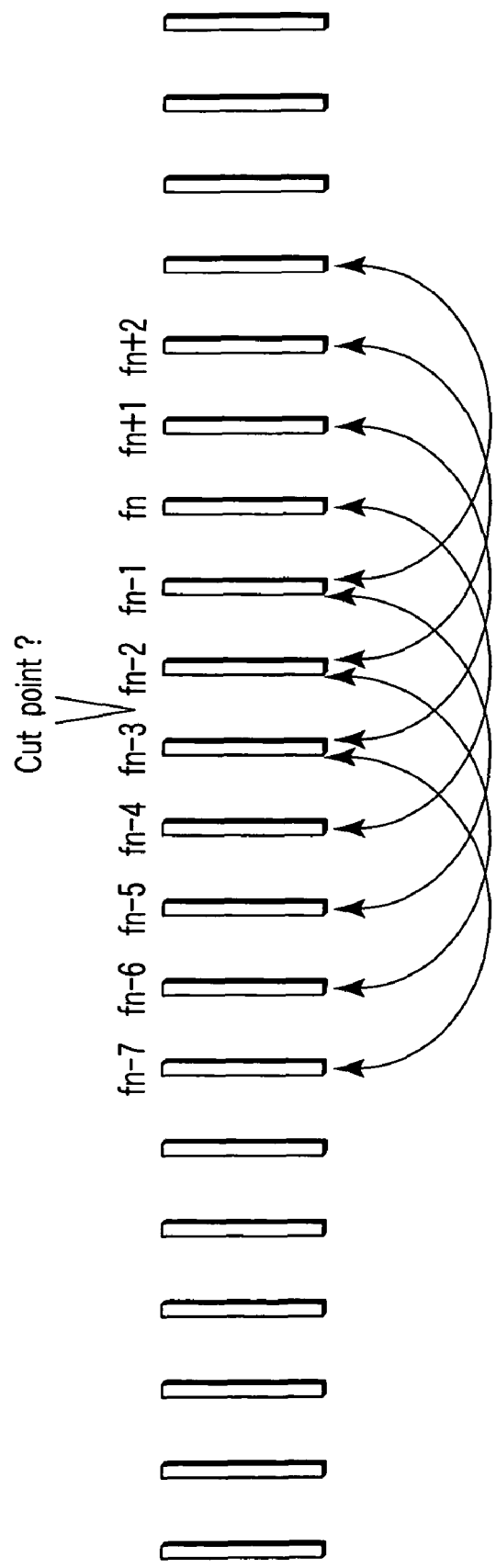
FIG. 17 is a diagram showing one example of a chapter dividing process similar to the automatic chapter dividing operation of a main body portion in the invention.

As shown in FIGS. 17 and 18, the function of the "structure analyzing chapter division" is to mainly analyze video data and determine the similarity of filed or frame images. The method enables determination of a chapter boundary by detecting a cut point, determining the similarity shot and calculating the frequency of dialogues or the like. In this case, a portion between cut points is referred to as a shot.

The "cut point detection" method enables an I picture frame and an I picture frame (or frames for each 0.5 second) to be compared and determination of whether the frames are similar to each other or not when a variation in the hue of the whole screen is large or an area in which a variation in the luminance is large has parameters larger in number than preset parameters. Then, the method sequentially compares the frames which are separated from each other by 0.5 second and sets a cut point in a desired portion of a period if the period is provided in which the number of sets of non-similar frames is larger than a threshold value. In FIG. 17, a state in which the similarity between frames indicated by arrows is determined is shown. Further, a state in which a cut point is set in a portion or period in which a large number of sets of non-similar frames are present is shown. In FIGS. 17 and 18, fn, fn-1, fn-2, . . . , fe, fe-1, fe-2, . . . indicate frames.

The "similar shot detection" method determines the similarity between each of several frames traced back from a certain past cut point and each of several frames lying after the closest cut point. FIG. 18 shows a state of a round robin. When the number of sets of frames which are determined to be similar is equal to or larger than a threshold value, the shots of both of the frames are determined to be similar. That is, as shown in FIG. 18, whether the frames between the shot A before the cut point and the shot D after the cut point D are similar or not is determined. In an example of the combination of the frames in FIG. 18, the results of similarity determination are obtained by the number of circular marks, for example.

The "dialog detection" and "dialog frequency" are defined as follows. (a) A period (portion) in which similar shots concentratedly appear is a significant period. (b) An index of "dialogue frequency" is introduced in order to numerically express the density with which similar shots appear. The "dialogue frequency" becomes higher as the following conditions are satisfied to a greater extent. (b1) A large number of shots are contained (=cut points frequently appear). (b2) The number of shots which contribute to the dialogue (which are similar) is large. (b3) The total time period of shots which contribute to the dialogue (which are similar) is long.

(c) The dialogue period is calculated based on the dialogue frequency. (d) Dialogue periods which are close to one another are connected.

The "structure analyzing chapter division" function is basically carried out by performing the above process. When cut points are set and similar shots are detected, it will be sufficient to perform the above process in some cases. However, in order to additionally provide a function of restructuring a plurality of program configurations, the following functions may be provided.

That is, a "news program inherent process" function and "other program processes" function are provided. The "news program inherent process" function detects a topic head shot and it is assumed that similar shots which are distributed at some rate in the program and appear at a certain frequency or more with certain length are treated as "head shots of topics". When the "head shots of topics" are successive, it is determined that the last one of the successive shots is a true "topic head shot" and the other shots are "follow-up shots of previous topics". In the "other program processes" function, a "corner title detection" function is set. The function determines similar shots which are widely distributed in the program, and do not belong to the dialogue period and appear at a certain frequency or more as a "corner title". If a corner title does not appear for some time after the program has started, the program is regarded as a "program having no corner title".

As described above, when information of cut points of the program, information of similar shots, information of a head topic of the news program or information of corner titles of other programs is acquired, the thus acquired information can be used as effective information in a case where the program is edited or the chapter of the program is structured.

In the above example, a case wherein the item 60b of "structure analyzing chapter division" appears on a screen 60-1 which appears by clicking the detail setting button on the program setting screen is shown. However, the item 60b used to set the "structure analyzing chapter division" can also be attained on a screen which is acquired by selecting recording equipment on the menu screen and on which a recording function is set.

Figure 19:
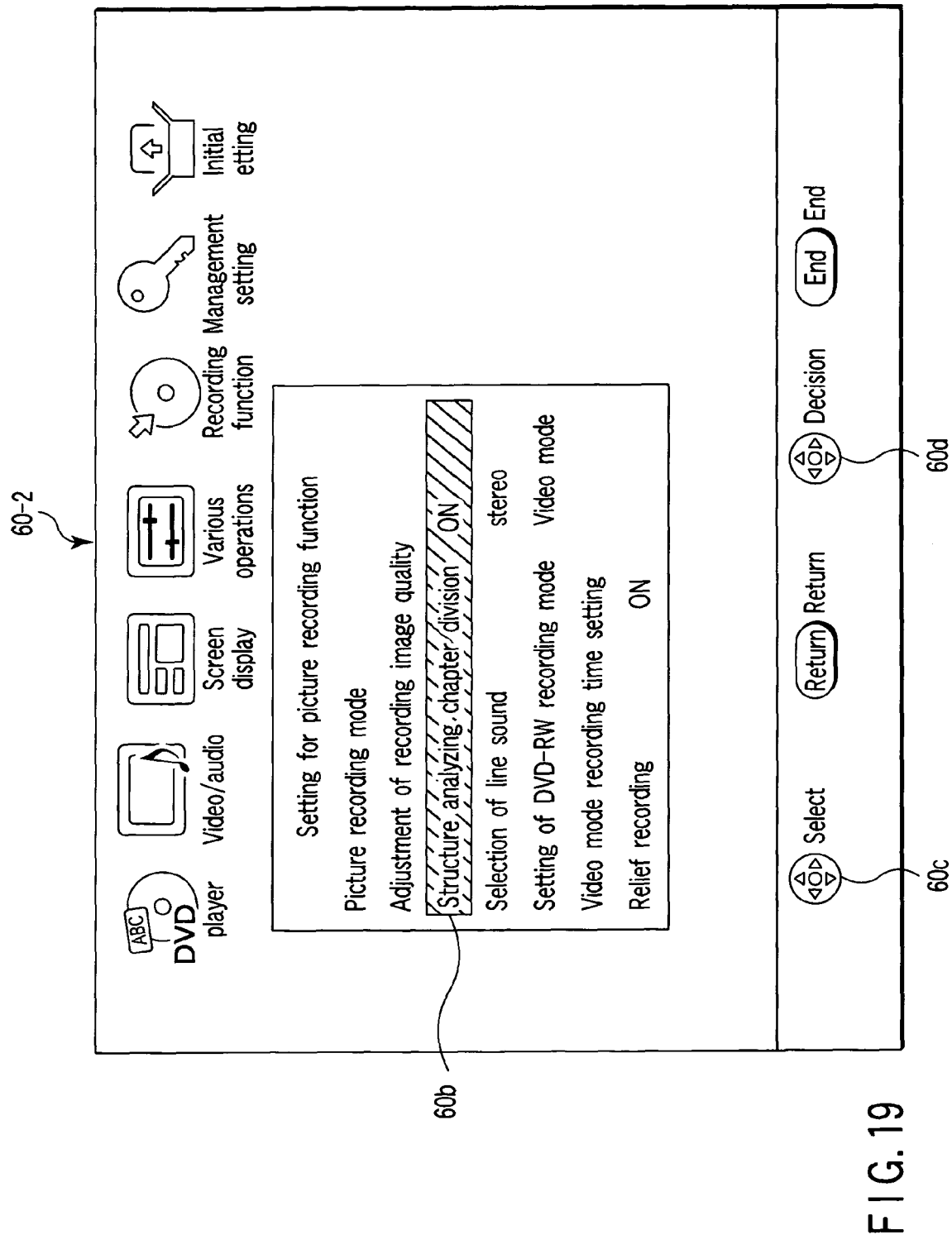
FIG. 19 is an exemplary diagram showing an example of a screen used to set the chapter dividing process explained in FIGS. 17 and 18.

FIG. 19 shows an example in which the item 60b of "structure analyzing chapter division" appears on a screen 60-2 on which the recording function is set. Also, on the above screen, the item 60b used to determine whether the "structure analyzing chapter division" process is performed or not appears.

On the above screens 60-1, 60-2, marks of the operating section of the remote controller are displayed. That is, a mark of a cursor key used to move the cursor in the vertical and horizontal directions and a mark of the decision key are displayed. The marks are effective keys to guide the user operation.

Figure 20:
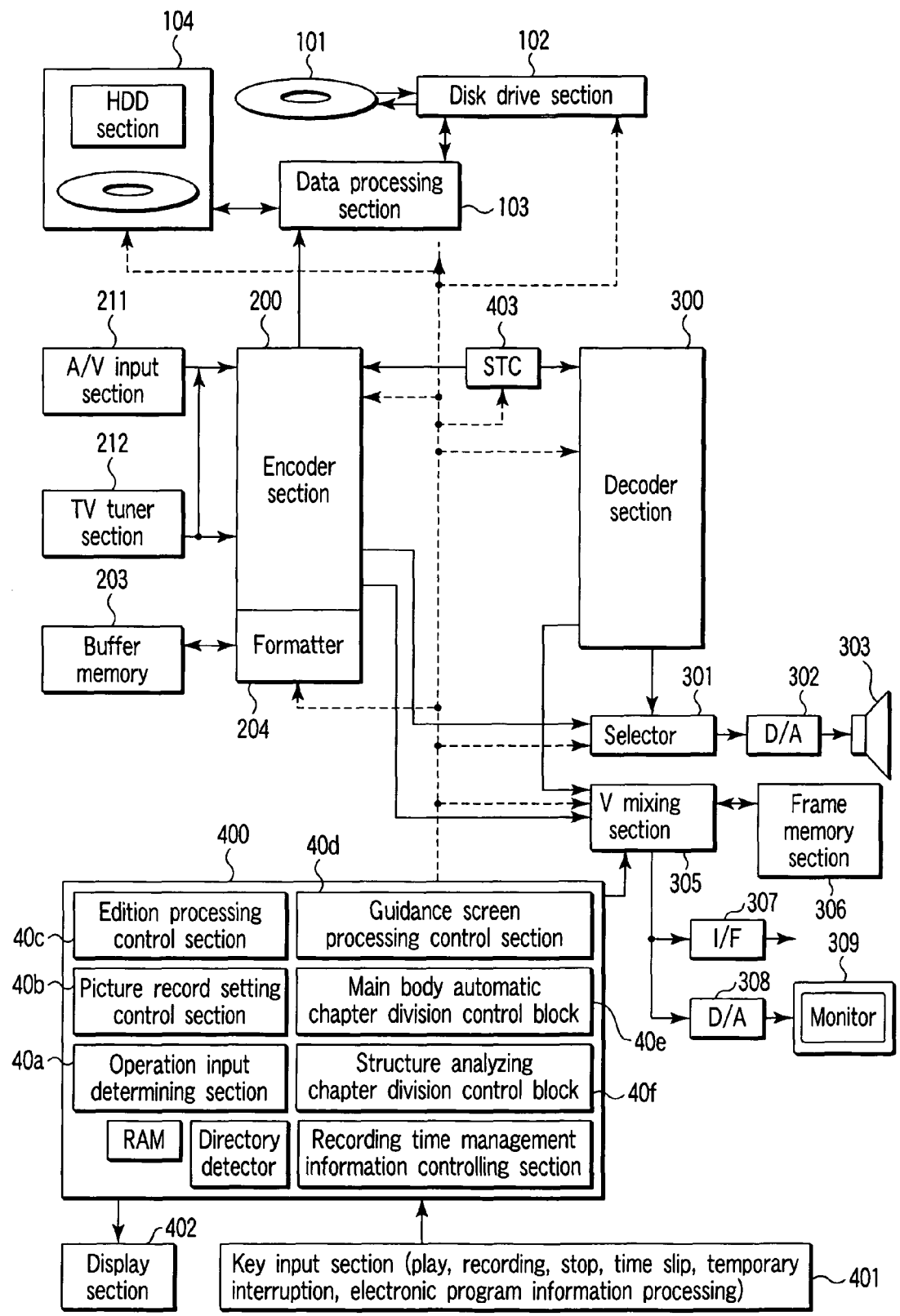
FIG. 20 is an exemplary diagram showing the configuration block of a recording and reproducing apparatus to which the invention is applied.

FIG. 20 is a diagram showing the whole configuration of a recording and reproducing apparatus to which this invention is applied. The recording and reproducing apparatus has two types of disk drive sections. The optical disk 101 is an information recording medium on which a video file can be configured. A disk drive section 102 rotates or drives the optical disk 101 to read or write information. A hard disk drive (HDD) section 104 drives a hard disk.

A data processor 103 can supply recording data to the disk drive section 102 and hard disk drive section 104 and receive a reproduced signal. The disk drive section 102 includes a rotation control system, laser drive system and optical system for the optical disk 101.

The data processor 103 deals with data in the recording or reproducing unit and includes a buffer circuit, modulation/demodulation circuit and error correction circuit.

The recording and reproducing apparatus has an encoder section 200 which configures a picture recording side, a decoder section 300 which configures a reproducing side, and a microcomputer block 400 which generally controls the operation of the apparatus main body as main constituents. The encoder section 200 includes a video and audio analog-digital converter which converts an input analog video signal and analog audio signal into a digital form, a video encoder and an audio encoder. Further, it includes a sub-video signal encoder which compresses movie subtitles or the like.

An output of the encoder section 200 is converted into a preset DVD format (such as a DVD-R, DVD-RW, DVD-RAM format) by a formatter 204 including a buffer memory 203 and then supplied to the data processor 103. The encoder section 200 is supplied with an external analog video signal and external analog audio signal from an AV input section 211 or an analog video signal and analog audio signal from a TV tuner 212. When the encoder section 200 is directly supplied with a compressed digital video signal and digital audio signal, it can directly supply the compressed digital video signal and digital audio signal to the formatter 204. Further, the encoder section 200 can directly supply an analog-digital converted digital video signal and audio signal to a video mixing section 305 and audio selector 301.

In the video encoder contained in the encoder section 200, a digital video signal is converted into a digital video signal compressed at a variable bit rate based on the MPEG2 or MPEG1 standard. The audio signal is converted into a digital audio signal of linear PCM or a digital audio signal compressed at a fixed bit rate based on an MPEG or AC-3 standard.

When a sub-video signal is input via the AV input section 211 (for example, a signal from a DVD video player having an independent output terminal of a sub-video signal), or when a DVD video signal with the above data configuration is broadcasted and received by the TV tuner 212, the sub-video signal in the DVD video signal is encoded (run-length coded) by use of a sub-video signal encoder to form a bit map of sub-video information.

The encoded digital video signal, digital audio signal, sub-video data are packed by the formatter 204 and converted into a video pack, audio pack and sub-video pack. Then, the data items are collected and converted into a format defined based on the DVD-recording standard (the standard according to which data is recorded on a DVD-RAM, DVD-R or DVD-RW, for example).

The apparatus used in this case can supply information (video, audio and sub-video data packs) formatted by the formatter 204 and management information formed to the data disk drive section 102 or hard disk drive section 104 via the data processor section 103 and record the information on the optical disk 101 or hard disk. Further, information recorded on the hard disk or optical disk can be recorded on the optical disk 101 or hard disk via the data processor section 103, and disk drive section 102.

The editing process can be performed by partially removing video objects of a plurality of programs recorded on the hard disk or optical disk 101 or connecting objects of different programs. This is because the data unit dealt with by the DVD format is defined and the editing process is simplified by processing the signal in the data unit.

The microcomputer block 400 includes an MPU (microprocessing unit) or CPU (central processing unit), a ROM in which a control program or the like is written and a RAM used to provide a work area required for execution of the program.

The MPU of the microcomputer 400 performs the defect location detecting process, unrecorded area detecting process, recording information recording position setting process, UDF recording process, AV address setting process and the like by using the RAM as a work area according to the control program stored in the ROM.

Further, the microcomputer block 400 has an information processing section required for controlling the whole system and includes a work RAM, directory detecting section, VMG (video management information of the whole portion) information forming section, copy-related information detecting section, copy and scrambling information processing section (RDI processing section), packet header processing section, sequence header processing section, aspect ratio information processing section and the like.

The contents of the execution result of the MPU which are to be informed to the user are displayed on a display section 402 of a video data recording and reproducing apparatus or displayed on a monitor display in an OSD (on-screen display) fashion. Further, the microcomputer block 400 has a key input section 401 which issues an operation signal used to operate the apparatus. Timings at which the microcomputer block 400 controls the disk drive section 102, hard disk drive section 104, data processor section 103, encoder section 200 and/or decoder section 300 and the like are determined based on time data from an STC (system time clock) 403.

The picture recording and reproducing operations are generally performed in synchronism with the time clock from the STC 403 and the other processes may be performed at timings independently from the timings of the STC 403.

The decoder section 300 includes a separator which separates and fetches each pack from a signal of the DVD format having a pack structure, a memory used at the pack separation time and other signal process execution time, a V decoder which decodes main video data (the contents of the video pack) separated by the separator, an SP decoder which decodes sub-video data (the contents of the sub-video pack) separated by the separator, and an A decoder which decodes audio data (the contents of the audio pack) separated by the separator. Further, it includes a video processor which adequately synthesizes decoded sub-video data on decoded main video data, superposes a menu, highlight button, subtitles and other sub-video data on the main video data and outputs the thus obtained data.

The output video signal of the decoder section 300 is input to the video mixing section 305. In the video mixing section 305, text data is synthesized. Further, a line via which a signal from the TV tuner 212 and A/V input section 211 is directly fetched is connected to the video mixing section 305. A frame memory 306 used as a buffer is also connected to the video mixing section 305. When an output of the video mixing section 305 is an analog output, it is output to the exterior via an I/F (interface) 307. When the output is a digital output, it is output to the exterior via a digital-analog converter 308.

The video mixing section 305 can output an image signal used to form a guidance screen (the screen explained in FIGS. 6 and 9) as a GUI. The image signal is controlled by a guidance screen processing control section in the microcomputer block 400. Further, an operation input determining section 40*a*, picture recording setting control section 40*b*, editing processing control section 40*c*, guidance screen processing control section 40*d* and the like are provided and the control section 400 generally controls the whole apparatus.

In the microcomputer block 400, a control block 40*e* which performs the "main body portion automatic chapter division" process and a control block 40*f* which performs the "structure analyzing chapter division" process are provided. The silent portion detector 25, silent time storage device 26, silent portion interval calculator 27, chapter boundary setting device 28 and part of the data processing section 24 explained in FIG. 11 correspond to the control block 40*e* which performs the "main body portion automatic chapter division" process. The separation information processing section 11*a* shown in FIG. 1 is contained in the control block 40*e*.

As shown in FIGS. 1, 11 and 20, the relation between the tuner 1, tuner 21 and tuner 212 is set in a correspondence relation. Further, in FIGS. 1 and 20, the tuner 1 and tuner 212 contain the audio signal processing section 22 of FIG. 11. The CPU 11 of FIG. 1, the silent portion detector 25, silent time storage device 26, silent portion interval calculator 27, chapter boundary setting device 28 of FIG. 11 and the control section 400 of FIG. 20 are set in a correspondence relation.

In FIG. 20, the output audio signal of the decoder section 300 is supplied to a digital-analog converter 302 via a selector 301, converted into an analog form and output to the exterior. The selector 301 is controlled by a select signal from the microcomputer block 400. Thus, when a digital signal from the TV tuner 212 or A/V input section 211 is directly monitored, the selector 301 can directly select a signal which has passed through the encoder section 200.

The formatter of the encoder section 200 forms separation information items during the picture recording operation and periodically supplies the same to the MPU of the microcomputer block 400 (information at the GOP head interruption time or the like). As the separation information, the number of packs of VOBUs (video object units), the end address of an I picture counted from the VOBU head, reproduction time of VOBU and the like are provided.

At the same time, it supplies information from an aspect information processing section to the MPU at the picture recording start time and the MPU forms VOB stream information (STI). In this case, the STI holds resolution data, aspect data and the like and the initialization process is performed based on the information in each decoder section upon reproduction.

Further, in the present apparatus, a video file is allocated one for each disk. Further, in order to continuously reproduce data without interruption, while the data is being accessed (or subjected to a seek operation), an information unit (size) of the minimum number of successive data items is determined. The unit is referred to as a CDA (Contiguous Data Area) The CDA size is an integral multiple of the ECC (Error Correction Code) block (16 sectors) and data is recorded in the CDA unit in the file system.

The data processor section 103 receives data of the VOBU unit from the formatter of the encoder section 200 and supplies the data of the CDA unit to the disk drive section 102 or hard disk drive section 104. Further, the MPU of the microcomputer block 400 forms management information required for reproducing recorded data and when it recognizes a command indicating the end of data recording, it supplies the formed management information to the data processing section 103. Thus, the management information is recorded on the disk. Therefore, while the encoding process is being performed, the MPU of the microcomputer block 400 receives information (for example, separation information) of the data unit from the encoder section 200. Further, the MPU of the microcomputer block 400 recognizes the management information (file system) read out from the optical disk or hard disk at the recording start time, recognizes an unrecorded area of each disk and sets the recording area of the data on the disk via the data processor section 103.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal separation information setting method utilizing audio modes which is a method for fetching an audio signal from an audio signal processing section and analyzing and processing a signal state in an apparatus which processes signals from a video signal processing section and the audio signal processing section, comprising:

determining whether one of total length and ratio of periods in which the audio signal is set in a first mode with respect to total length of a recorded program video signal is not larger than a corresponding one of preset length and preset ratio, determining that an audio mode of a main body portion of the recorded video signal is a second mode when one of the total length and ratio is not larger than the corresponding one of the preset length and ratio, determining that the audio mode of the main body portion is the first mode when the audio mode is not the second mode, selecting and setting an adaptive processing section which forms separation information of a desired period of the video signal according to the above determination result, and storing separation information formed in the thus set adaptive processing section.

2. The video signal separation information setting method utilizing audio modes according to claim 1, wherein the second mode is a stereo mode.

3. The video signal separation information setting method utilizing audio modes according to claim 2, wherein a portion of the audio signal whose audio level is set not to be higher than a threshold level for a preset time period is determined as a silent portion when the main body portion is set in the stereo mode, whether a time interval between the silent portion and a next silent portion is an integral multiple of a preset time period (A) is determined, the number of detected silent portions is counted when the time interval is an integral multiple of the preset time period (A), and separation information is set in silent portions which first and lastly appear when the count number of the silent portions is not smaller than a threshold value (B).

4. The video signal separation information setting method utilizing audio modes according to claim 3, wherein the preset time period (A) is 15 seconds.

5. The video signal separation information setting method utilizing audio modes according to claim 3, wherein separation information in a desired interval of the video signal is also formed in a position in which the first and second audio modes are switched.

6. The video signal separation information setting method utilizing audio modes according to claim 2, wherein the separation information is formed in a position in which the first and second audio modes are switched when the main body portion is determined to be set in the first mode.

7. The video signal separation information setting method utilizing audio modes according to claim 1, wherein the preset ratio is not smaller than 3/120 and not larger than 1/2.

8. The video signal separation information setting method utilizing audio modes according to claim 1, wherein the preset ratio is approximately 1/2".

9. The video signal separation information setting method utilizing audio modes according to claim 1, wherein the preset ratio is approximately 1/8.

10. A video signal separation information setting method utilizing audio modes which is a method for fetching an audio signal from an audio signal processing section and analyzing and processing a signal state in an apparatus which processes signals from a video signal processing section and the audio signal processing section, comprising:
   determining whether one of total length and ratio of periods in which the audio signal is set in a first mode with respect to desired length of a recorded program video signal is not larger than a corresponding one of preset length and preset ratio,
   determining that an audio mode of a main body portion of the recorded video signal is a second mode when one of the total length and ratio is not larger than the corresponding one of the preset length and ratio,
   determining that the audio mode of the main body portion is the first mode when the audio mode is not the second mode,
   selecting and setting an adaptive processing section which forms separation information of a desired period of the video signal according to the above determination result, and
   storing separation information formed in the thus set adaptive processing section.

11. A video signal separation information setting apparatus utilizing audio modes which processes signals from a video signal processing section and audio signal processing section, fetches an audio signal from the audio signal processing section and analyzes and processes a signal state, comprising:
   an audio mode state determining section which determines whether one of total length and ratio of periods in which the audio signal is set in a first mode with respect to total length of recorded program video signals is not larger than a corresponding one of preset length and preset ratio,
   an audio mode deciding section for a main body portion which determines that an audio mode of a main body portion of the recorded video signal is a second mode when one of the total length and ratio is not larger than the corresponding one of the preset length and ratio and determines that the audio mode of the main body portion is the first mode when the audio mode is not the second mode,
   a processing contents switching section which selects and sets an adaptive processing section which forms separation information of a desired period of the video signal according to the above determination result, and
   a storage processing section which stores separation information formed in the thus set adaptive processing section.

* * * * *